(12) United States Patent
Moran

(10) Patent No.: US 11,352,139 B2
(45) Date of Patent: Jun. 7, 2022

(54) AIRCRAFT MONUMENT AND A SEAT ASSEMBLY

(71) Applicant: THE BOEING COMPANY, Chicago, IL (US)

(72) Inventor: Thomas Joseph Moran, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 873 days.

(21) Appl. No.: 15/927,139

(22) Filed: Mar. 21, 2018

(65) Prior Publication Data

US 2019/0291868 A1    Sep. 26, 2019

(51) Int. Cl.
| B64D 11/06 | (2006.01) |
| B64D 11/00 | (2006.01) |
| B64D 11/04 | (2006.01) |
| B64D 13/08 | (2006.01) |
| B64D 13/06 | (2006.01) |

(52) U.S. Cl.
CPC .......... *B64D 11/04* (2013.01); *B64D 11/0007* (2013.01); *B64D 11/06* (2013.01); *B64D 11/0602* (2014.12); *B64D 11/0606* (2014.12); *B64D 11/0627* (2014.12); *B64D 11/0691* (2014.12); *B64D 13/08* (2013.01); *B64D 2011/0046* (2013.01); *B64D 2013/0629* (2013.01)

(58) Field of Classification Search
CPC ............ B64D 11/0007; B64D 11/0602; B64D 11/0606; B64D 11/0627; B64D 2013/0629; B64D 11/0691
See application file for complete search history.

(56) References Cited

U.S. PATENT DOCUMENTS

| 9,682,780 | B2 | 6/2017 | Boenning et al. | |
| 9,802,703 | B2 | 10/2017 | Moran | |
| 9,896,212 | B2 | 2/2018 | Savian et al. | |
| 2011/0253835 | A1 | 10/2011 | Cook | |
| 2014/0332629 | A1 | 11/2014 | Hashberger | |
| 2016/0009395 | A1* | 1/2016 | Savian | B64D 11/02 244/118.5 |
| 2016/0114892 | A1* | 4/2016 | Moran | B64D 11/0007 244/118.5 |
| 2016/0257408 | A1* | 9/2016 | Gill | B64D 11/0606 |
| 2017/0320580 | A1 | 11/2017 | Roth | |
| 2018/0009531 | A1* | 1/2018 | Gill | B64D 11/02 |
| 2018/0037323 | A1 | 2/2018 | Moran | |
| 2018/0208314 | A1* | 7/2018 | Heidtmann | B64D 11/0007 |

OTHER PUBLICATIONS

European Search Report of related Application No. 19164229.7 dated Aug. 7, 2019; 10 pages.

\* cited by examiner

*Primary Examiner* — Nicholas McFall
*Assistant Examiner* — Terri L Filosi
(74) *Attorney, Agent, or Firm* — The Small Patent Law Group LLC; Jay J. Hoette

(57) ABSTRACT

An aircraft monument for use in a cabin of an aircraft includes a monument assembly and a seat assembly. The monument assembly includes a frame having a plurality of walls defining a compartment. The plurality of walls include a first end wall having a forward section at a forward plane of the frame. The compartment is defined rearward of the forward section. The seat assembly is forward of the frame. The seat assembly has a shell configured to at least partially surround a passenger seat. The shell has a rear rearward of the forward plane of the frame.

20 Claims, 5 Drawing Sheets

AIRCRAFT MONUMENT AND A SEAT ASSEMBLY

BACKGROUND

The present disclosure relates generally to aircraft monuments, such as a monument having a seat assembly.

Aircraft typically include multiple aircraft monuments, such as closet monuments, lavatory monuments, and galley monuments, used to store various items, such as clothes, bags, supplies, food, beverages, and the like on the aircraft. For galley monuments, the food and beverages are typically stored in galley carts which are transported to the aircraft and stored in refrigerated compartments or zones in the galley monuments. A heat exchanger supplies cooled air to each of the compartments or zones via a plurality of air ducts and other components. The air ducts and the supply and return devices associated with the air ducts are routed along the back wall of the galley cart compartments to supply the cooled air to the galley cart compartments and to return the air to the heat exchanger. For example, vertical ducts may extend from the heat exchanger along the back wall of the galley monument to an appropriate location of the galley monument for supplying the airflow.

Other aircraft systems may have components routed along the monument walls, such as electrical lines, plumbing lines, and the like. The system components occupy valuable space in the aircraft monuments. The footprint of the aircraft monument is wide enough to accommodate the components located therein, such as the galley carts and the airflow supply and return components. The aircraft monuments occupy valuable space within the cabin of the aircraft, which limits the number of passenger seats that may be provided on the aircraft. For example, the airflow supply and return components may add approximately 4 to 5 inches of width to the galley monuments, and some aircraft may have eight or more galley monuments, leading to a large amount of cabin space dedicated to the airflow supply and return components, which may be used for other purposes.

In some aircraft, some passenger areas, such as first class passenger areas and business class passenger areas, include more comfortable and private passenger seating modules. The seating modules in such areas include shells forming pods around the passenger seating compartment. The shells have walls that extend at least partially, and in some seating modules entirely, from the cabin floor to the ceiling. The shells occupy space in the cabin of the aircraft, limiting the number of passenger seats that may be included on the aircraft.

SUMMARY

In accordance with one embodiment, an aircraft monument is provided for use in a cabin of an aircraft having a monument assembly and a seat assembly. The monument assembly includes a frame having a plurality of walls defining a compartment. The plurality of walls include a first end wall having a forward section at a forward plane of the frame. The compartment is defined rearward of the forward section. The seat assembly is forward of the frame. The seat assembly has a shell configured to at least partially surround a passenger seat. The shell has a rear rearward of the forward plane of the frame.

In accordance with one embodiment, an aircraft monument is provided for use in a cabin of an aircraft having a monument assembly and a seat assembly. The monument assembly includes a frame having a plurality of walls defining a compartment. The plurality of walls include a first end wall having a jogged portion. The first end wall has an upper section, a lower section and a transition section between the upper section and the lower section defining the jogged portion. An upper intersection between the transition section and the upper section is at a first plane and a lower intersection between the transition section and the lower section is at a second plane laterally offset forward of the first plane. The compartment is defined rearward of at least one of the upper section and the lower section. The seat assembly has a shell configured to at least partially surround a passenger seat. The shell has a rear with a jogged portion. The rear has an upper section extending along the upper section of the first end wall, a lower section extending along the lower section of the first end wall and a transition section extending along the transition section of the first end wall. The transition section of the shell extends between the upper section and the lower section and defining the jogged portion of the shell. The upper section of the shell is rearward of the forward plane and the lower section of the shell is positioned forward of the forward plane.

In accordance with one embodiment, a seat assembly is provided for attachment to an aircraft monument in a cabin of an aircraft. The monument seat assembly includes a shell having a plurality of walls defining a seat compartment configured to at least partially surround a passenger seat. The plurality of walls include a first end wall having a rear section having a jogged portion. The rear section has an upper section, a lower section and a transition section between the upper section and the lower section. The transition section defines the jogged portion. The first end wall has an outer surface configured to face the aircraft monument. The upper section is positioned rearward of the transition section. The lower section is positioned forward of the rear transition section. The monument seat assembly includes a rear cavity outside of the shell. The rear cavity is rearward of the outer surface of the first end wall. The rear cavity is positioned below the rear transition section.

The features and functions that have been discussed can be achieved independently in various embodiments or may be combined in yet other embodiments, further details of which can be seen with reference to the following description and drawings.

DETAILED DESCRIPTION

Figure 1:
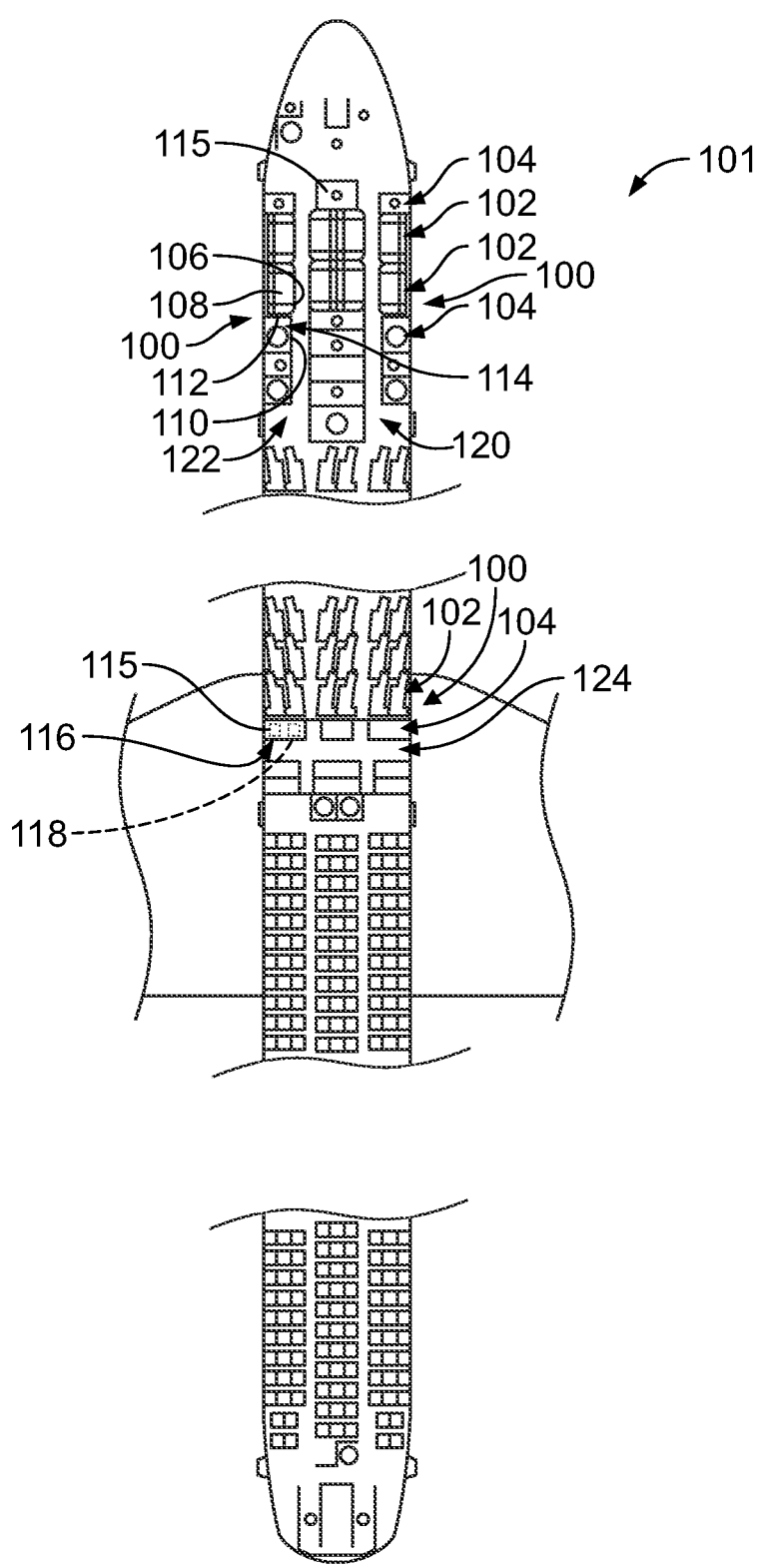
FIG. 1 is a schematic illustration of an exemplary aircraft monument for an aircraft in accordance with an exemplary embodiment.

The following detailed description of certain embodiments will be better understood when read in conjunction with the appended drawings. It should be understood that the various embodiments are not limited to the arrangements and instrumentality shown in the drawings.

Described herein are various embodiments of an aircraft monument for an aircraft having an integrated seat assembly. Various embodiments provide an interface between the monument and the seat assembly that utilizes space below the seat assembly for stowage and/or routing of components of the monument in such space. Various embodiments orient the seat assembly relative to the monument to provide additional space in the passenger compartment, such as for adding additional room for passenger seating. Various embodiments integrate the seat assembly with a galley monument and allow for routing of galley refrigeration components below the seat assembly to reduce the effective footprint of the galley monument.

FIG. 1 is a schematic illustration of an exemplary aircraft monument 100 for an aircraft 101. The aircraft monument 100 includes a seat assembly 102 and a monument assembly 104. The seat assembly 102 and the monument assembly 104 are integrated. For example, in various embodiments, the seat assembly 102 is an integral part of the monument assembly 104. The structure of the seat assembly 102 and the structure of the monument assembly 104 may be a monolithic structure formed and installed as a single unit. In other various embodiments, the seat assembly 102 is coupled to the monument assembly 104. The seat assembly 102 and the monument assembly 104 are nested together. For example, the seat assembly 102 may at least partially overlap with the monument assembly 104 and/or the monument assembly 104 may at least partially overlap with the seat assembly 102.

The seat assembly 102 includes a shell 106 that at least partially surrounds a passenger seat 108. In various embodiments, the shell 106 provides structural support for the passenger seat 108. The shell 106 encloses the space around the passenger seat 108, such as to provide privacy for the passenger. The shell 106 may define the aesthetic or finished look of the seat assembly 102 within the aircraft 101. In various embodiments, the seat assembly 102 is used for first class seating or business class seating.

The monument assembly 104 includes a frame 110 having a plurality of walls 112 defining one or more compartments 114. The compartment(s) 114 may be used for storing items in the monument assembly 104. The compartment(s) 114 may be used for routing items, such as plumbing lines, electrical lines, air handling components or other items of the aircraft 101. In various embodiments, the frame 110 of the monument assembly 104 and the shell 106 of the seat assembly 102 have complementary shapes to efficiently utilize the space in the aircraft 101. For example, at least a portion of the frame 110 overlaps with a portion of the shell 106 and likewise a portion of the shell 106 overlaps with a portion of the frame 110.

In various embodiments, the monument assembly 104 is a galley monument 115 of the aircraft 101, and the monument assembly 104 may be described herein with particular reference to the galley monument 115. However, the monument assembly 104 may be another type of monument in alternative embodiments, such as a lavatory monument, a closet monument, and the like and such monument types may include other components typical of such monuments, examples of which may be described herein. The compartment 114 of the galley monument 115 includes one or more galley cart compartments 116 that receive galley carts 118. The galley monument 115 is used to cool the galley cart compartments 116 and the galley carts 118 and items stowed in the galley carts 118 held in the galley cart compartments 116. The galley cart compartments 116 are typically arranged below a counter of the galley monument 115. As used herein a galley cart compartment is an insulated volume that is utilized to store one or more galley carts 118 on the aircraft 101. A galley cart, as used herein, is a portable device that is used to store food and/or beverages that are transported from a caterer to the aircraft 101 or from the galley cart compartments 116 to other parts of the aircraft 101 for serving the food and/or beverages. The galley carts may include wheels, however some galley carts may be hand carried boxes in some embodiments. The compartment 114 may include other spaces other than the galley cart compartments 116 in various embodiments.

The galley monument 115 is positioned within a cabin 120 of the aircraft 101, and the cabin 120 of the aircraft 101 is divided into a passenger area 122, where the seat assembly 102 is located, and a galley area 124, where the galley monument 115 is located. The passenger area 122 is the area exterior of the galley monument 115 within the aircraft 101 where passengers are able to be located. Space dedicated to the galley monument 115 is unusable for passenger seats or other purposes such as lavatories, and thus it may be desirable for aircraft manufacturers to reduce the effective footprint of the galley area 124 in order to increase the passenger area 122 to increase revenue of each flight for aircraft operators.

The galley monument 115 may include any number of galley cart compartments 116 and the aircraft 101 may include any number of galley monuments 115. The galley monuments 115 are typically arranged near the doors of the aircraft 101, such as at the fore and/or aft of the cabin 120, but may be located mid-cabin in some embodiments. The galley monument 115 may be positioned between different sections of the aircraft 101, such as separating a first class cabin from a business class cabin and/or from an economy class cabin. The galley monuments 115 may be used for the storage and/or preparation of food or beverages. Some galley monuments 115 may be bar units used strictly for preparation of beverages. Some galley monuments 115 may be incorporated into other monument assemblies 104 used for other purposes such as closets, workstations, lavatories, and the like.

The galley monument 115 includes a galley refrigeration system 125 (shown in FIG. 2) used to supply cooled airflow for cooling the galley carts 118. The galley refrigeration system 125 includes a heat exchanger 126 (shown in FIG. 2) that provides cooled air. The heat exchanger 126 may be positioned above the galley monument 115 (e.g., in the crown of the aircraft 101), may be positioned in the galley monument 115, or may be positioned below the galley monument 115 (e.g., in the belly of the aircraft 101) in various embodiments. The galley refrigeration system 125 includes an airflow supply and return system 128 (shown in FIG. 2), in flow communication with the heat exchanger 126 and the galley cart compartments 116, to channel the air supply from the heat exchanger 126 to the galley cart compartments 116 and back to the heat exchanger 126. In an exemplary embodiment, the frame 110 and the shell 106 are shaped to accommodate part of the galley refrigeration system 125 below the shell 106. For example, in the illustrated embodiment, ducts of the airflow supply and return system 128 may be routed in a space underneath the shell 106, thus reducing the effective footprint of the galley monument 115. For example, the depth of the compartment 114, in some areas, may be reduced because the ducts are routed underneath the shell 106 to reduce the effective footprint of the galley monument 115. The effective footprint is reduced by overlapping portions of the monument assembly 104 and the seat assembly 102. The effective footprint is reduced by routing portions of the galley refrigeration system 125 within the effective footprint of the seat assembly 105.

Figure 2:
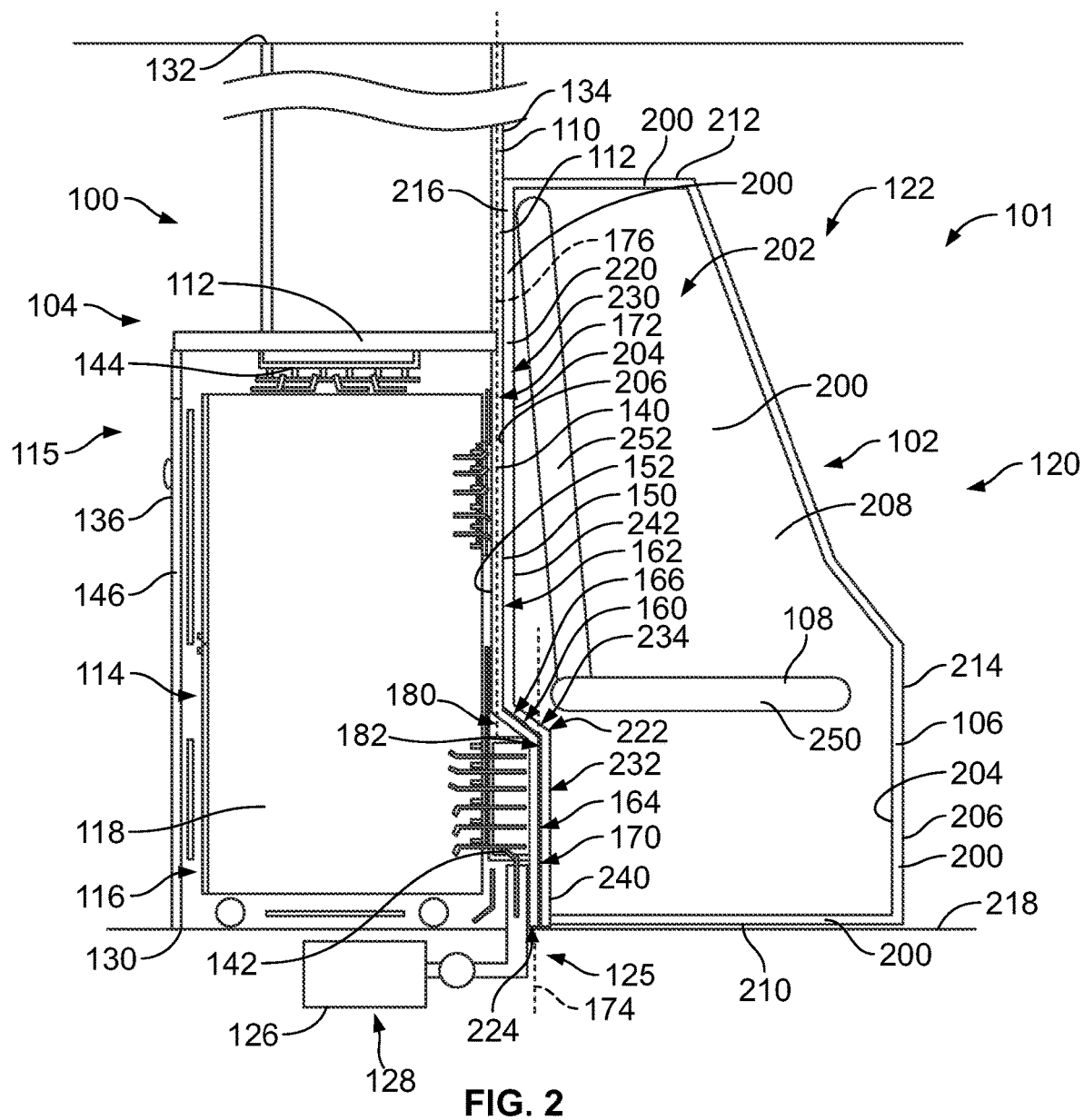
FIG. 2 is a cross-sectional view of the aircraft monument in accordance with an exemplary embodiment showing a seat assembly and a monument assembly.

FIG. 2 is a cross-sectional view of the aircraft monument 100 in accordance with an exemplary embodiment showing the seat assembly 102 and the monument assembly 104 in the form of the galley monument 115. The frame 110 includes a base 130, a top 132, a front 134, and a rear 136 opposite the front 134, and may include at least one side (not shown). The rear 136 may be forward facing or rearward facing in the aircraft 101, depending on the orientation of the galley monument 115 within the cabin 120. The front 134 faces the seat assembly 102. The walls 112 of the frame 110 define the various portions of the galley monument 115. For example, the walls 112 may define the compartment 114, such as the galley cart compartments 116, upper storage compartments, stowage cabinets, and the like. The walls 112 may be oriented generally vertically, horizontally or in other orientations. For example, one of the walls 112 may define the counter at the top of the galley cart compartments 116. The walls 112 may be interior walls or exterior walls. The walls 112 may extend along the front 134 to separate the galley monument 115 from the seat assembly 102. The walls 112 may define the sides of the galley monument 115.

In an exemplary embodiment, the airflow supply and return system 128 is arranged within the galley monument 115. Cool air from the heat exchanger 126 (FIG. 1) is directed through the airflow supply and return system 128 to the galley cart compartment 116 and returned from the galley cart compartment 116 back to the heat exchanger 126. A fan may be used in the airflow supply and return system 128 to increase the flow of air through the galley monument 115. In various embodiments, the heat exchanger 126 may be a liquid-cooled chilling unit that provides chilled liquid, such as a refrigerant, to cool the air supply. Heat exchanging of the liquid may be performed remote from the galley monument 115, such as in the belly of the aircraft 101 or in the crown of the aircraft 101. In other various embodiment, the heat exchanger 126 may be a conventional refrigeration unit, which includes an evaporator, a condenser, a compressor, and an expansion valve (not shown).

Components of the airflow supply and return system 128 are routed in various locations to supply and return the air as needed. In an exemplary embodiment, the components of the airflow supply and return system 128 are routed in areas to reduce a depth of at least a portion of the galley monument 115. For example, one or more ducts of the airflow supply and return system 128 are routed to locations underneath the seat assembly 102 to reduce the depth of the galley cart compartment 116, which may decrease the effective footprint of the galley monument 115, and thus increase the effective footprint of the passenger area 122. In the illustrated embodiment, components of the airflow supply and return system 128 are generally arranged along the front 134 of the galley monument 115, such as along a first end wall 140 of the frame 110. The first end wall 140 is one of the walls 112. The first end wall 140 separates the galley monument 115 from the seat assembly 102. The compartment(s) 114 are positioned rearward of the first end wall 140. The first end wall 140 may define the galley cart compartment 116.

The airflow supply and return system 128 includes at least one cooling air supply duct 142 to supply cooled air to the galley cart compartment(s) 116 and at least one air return duct 144 to return air to the heat exchanger 126. In the illustrated embodiment, the air supply duct 142 is provided at the first end wall 140 and positioned at least partially under the seat assembly 102, whereas the air return duct 144 is located above the galley cart 118, such as underneath the counter. Other locations of the air supply and return ducts 142, 144 may be utilized in alternative embodiments, such as having the air return duct 144 along the first end wall 140, such as at least partially below the seat assembly 102. In the illustrated embodiment, the air supply duct 142 is provided at or near the base 130, such as for receiving airflow from below the cabin floor. Other locations are possible in alternative embodiments, such as at or near the counter. The air supply and return ducts 142, 144 may be defined by separate structures, such as sheet metal ducts set in the walls 112 or coupled to the walls 112. The air supply and return ducts 142, 144 may include air vents or air grilles for interfacing with the galley carts 118 or the galley cart compartment 116.

The galley cart compartment 116 is positioned near the base 130, such as below the counter, for loading and unloading of the galley carts 118 into the galley cart compartment 116. The galley cart compartment 116 has one or more doors 146 at the rear 136 that may be opened to provide access to the galley cart compartment 116, such as to load and unload the galley cart 118 through the rear 136. The door(s) 146 may be closed to retain the galley cart 118 in the galley cart compartment 116 and/or to enclose the cooling space in the galley cart compartment 116 and/or to provide thermal insulation. In an exemplary embodiment, when the galley cart 118 is positioned in the galley cart compartment 116, a space is defined about the galley cart 118. Optionally, air may be able to flow around the galley cart 118 in the space for cooling the galley cart 118 and/or for returning to the air return duct 144.

The airflow supply and return system 128 is in flow communication with the galley cart 118. For example, the air supply duct 142 supplies air to the galley cart compartment 116 and the galley cart 118 in the galley cart compartment 116. The air return duct 144 is in flow communication with the galley cart compartment 116 and the galley cart 118 in the galley cart compartment 116. During use, flow of air through the supply and return system 128 flows through the air supply duct 142 and into the galley cart 118. The air passes over the food or beverages in the galley cart 118, such as by an air-through-cart supply arrangement. The air from the galley cart 118 then flows into the space around the galley cart 118 in the galley cart compartment 116. The door 146 closes the galley cart compartment 116 to define the space and contain the air in the space. The air is able to flow around the outside of the galley cart 118 within the space in an air-over-cart supply arrangement to the air return duct 144. By channeling the air around the galley cart 118 within the space, the galley monument 115 has the benefits of both an air-through-cart supply arrangement and an air-over-cart supply arrangement, which may increase the cooling efficiency of the galley monument 115. In other various embodiments, the air may be supplied to the cart compartment 116 in the space around the galley cart 118 and then is pulled through the galley cart 118, where the air return duct 144 is directly coupled to the galley cart 118 and pulled through the galley cart 118. Other cooling arrangements are possible in alternative embodiments, such as only an air-through-cart arrangement or only an air-over-cart arrangement.

The first end wall 140 is provided at the front 134 of the galley monument 115 opposite the doors 146. The first end wall 140 includes a front surface 150 and a rear surface 152. The front surface 150 faces the seat assembly 102; however, as noted above, the front surface 150 may be forward facing or aft facing within the aircraft 101 depending on the orientation of the galley monument 115 in the aircraft 101. The rear surface 152 faces the compartment 114.

In an exemplary embodiment, at least a portion of the first end wall 140 is shifted forward as compared to at least one other portion of the first end wall 140. The shell 106 is shaped to receive the portion of the first end wall 140 that is shifted forward. The first end wall 140 is non-planar. The first end wall 140 includes a jogged portion 160 and the shell 106 is shaped to receive the jogged portion 160. By locating the jogged portion 160 in the shell 106, the galley monument 115 may be shifted forward to reduce the effective footprint of the galley monument 115. The galley monument 115 is wider at the portion that is shifted forward and narrower at the other portions that are not shifted forward. The shell 106 includes a pocket or cavity that receives the wider portion of the galley monument 115. Allowing the galley monument 115 to shift forward equates to an increase in volume of the passenger area 122. For example, more space may be provided for passenger seats.

The jogged portion 160 shifts portions of the first end wall 140 closer to the galley cart 118 as compared to other portions. For example, the first end wall 140 is non-planar with an upper section 162 above the jogged portion 160 and a lower section 164 below the jogged portion 160. A transition section 166 extends between the upper section 162 and the lower section 164. In the illustrated embodiment, the upper section 162 is positioned a first distance (e.g., closer to) from the galley cart 118 and the lower section 164 is positioned a second distance (e.g., further from) from the galley cart 118. Optionally, the upper section 162 may extend generally vertically and the lower section 164 extends generally vertically with the transition section 166 angled therebetween. Other orientations are possible in alternative embodiments. The jogged portion 160 may be angled non-horizontal between the upper section 162 and the lower section 164 to provide a smooth transition between the upper section 162 and the lower section 164. Optionally, the jogged portion 160 may be curved. The upper section 162 may be oriented non-vertically in alternative embodiments. The lower section 164 may be oriented non-vertically in alternative embodiments.

The transition section 166 may have multiple segments in other embodiments. The transition section 166 may transition smoothly into the upper section 162 and/or the lower section 164 in other embodiments. In the illustrated embodiment, the upper section 162 defines the majority of the first end wall 140 below the counter, with the transition section 166 being relatively short and the lower section 164 below the transition section 166. However, the upper section 162, the lower section 164 and the transition section 166 may have different heights in alternative embodiments. In various embodiments, the lower section 164 may be positioned below the height of the passenger seat 108. The jogged portion 160 may be positioned in close proximity to the air supply components, such as the air supply duct 142 to provide the greatest amount of gained space above the jogged portion 160 for the seat assembly 102.

In an exemplary embodiment, the first end wall 140 includes a forward section 170 and a rear section 172. The forward section 170 is shifted forward compared to the rear section 172 and the rear section 172 is shifted rearward compared to the forward section 170. In the illustrated embodiment, the forward section 170 is defined by the lower section 164 and the rear section 172 is defined by the upper section 162. The forward section 170 defines a forward plane 174 at the intersection of the lower section 164 and the transition section 166. The forward plane 174 is oriented vertically and may define the forward-most point of the first end wall 140. Optionally, the lower section 164 extends along the forward plane 174. The compartment 114 is located rearward of the forward plane 174. In an exemplary embodiment, at least a portion of the seat assembly 102 is located rearward of the forward plane 174. For example, the rear of the shell 106 extends to the upper section 162 of the first end wall 140, and is thus rearward of the forward plane 174. The rear section 172 defines a rearward plane 176 at an upper intersection 180 of the upper section 162 and the transition section 166. The forward plane 174 is at a lower intersection 182 between the transition section 166 and the lower section 164 that is laterally offset forward of the rearward plane 176. The rearward plane 176 is oriented vertically and may define the rearward-most point of the first end wall 140. The forward plane 174 is laterally offset forward of the rearward plane 176. Optionally, the upper section 162 extends along the rearward plane 174. The compartment 114 is located rearward of the rearward plane 176.

In an exemplary embodiment, the jogged portion 160 reduces the width of the corresponding portion (e.g., the upper half) of the galley cart compartment 116 by a significant amount. For example, the jogged portion 160 may reduce the width by at least 5%. Optionally, the jogged portion 160 may reduce the width by 10% or more. By having the seat assembly 102 extend further rearward, such as to the upper section 162 above the jogged portion 160, the jogged portion 160 may increase seat reclining room and/or leg room of the seat assembly 102 and/or allow additional seats in the passenger area. Optionally, the jogged portion 160 may shift the position of the upper section 162 of the first end wall 140 by at least 3 inches. The jogged portion 160 may shift the upper section 162 by more than 3 inches in alternative embodiments. In aircraft 101 having multiple galley monuments 115, reducing the effective footprint of multiple galley monuments 115 may allow additional rows of passenger seats in the aircraft 101, which may increase the revenue produced by the aircraft 101.

The seat assembly 102 includes the shell 106 and the passenger seat 108. The shell 106 includes a plurality of walls 200 defining a seat compartment 202. The passenger seat 108 is located within the seat compartment 202. The walls 200 have inner surfaces 204 facing the seat compartment 202. The walls 200 have outer surfaces 206 facing away from the seat compartment 202. In an exemplary embodiment, at least one of the walls 200 of the shell 106 is a side wall 208. For example, the side wall 208 may be located between passenger seats 108 or along the aisle of the cabin 120.

In an exemplary embodiment, the side wall 208 extends between a base 210 and a top 212 of the shell 106. The side wall 208 may extend between a front 214 and a rear 216 of the shell 106. The base 210 may be mounted to a cabin floor 218 of the cabin 120. One of the walls 200 may be provided at the base 210. Alternatively, the shell 106 may be open at the base 210. In an exemplary embodiment, the top 212 is located above the passenger seat 108. Optionally, the top 212 may extend to the ceiling of the cabin 120. Alternatively, the top 212 may be located below the ceiling such that passengers can see over the top 212. The rear 216 faces the frame 110 of the monument assembly 104. In an exemplary embodiment, the rear 216 abuts against the frame 110.

In an exemplary embodiment, at least one of the walls 200 of the shell 106 is a first end wall 220 at the rear 216. The first end wall 220 closes off the rear 216 of the shell 106. The first end wall 220 may abut against the first end wall 140 of the monument assembly 104. The first end wall 220 may be connected to the first end wall 140. For example, the first end wall 220 may be secured to the first end wall 140 by fasteners, clips, welding, and the like. The first end wall 220 of the shell 106 may have a complementary shape as the first end wall 140 of the monument assembly 104 and nest with the first end wall 140 of the frame 110. The first end wall 220 may mirror the first end wall 140 of the frame 110. The first end wall 220 separates the passenger seat 108 from the monument assembly 104. In an exemplary embodiment, at least a portion of the first end wall 220 is shifted forward as compared to at least one other portion of the first end wall 220. For example, the shell 106 is shaped to receive the jogged portion 160 of the first end wall 140. The first end wall 220 is non-planar. The first end wall 220 includes a jogged portion 222 defining a rear cavity 224 rearward of the outer surface 206. The rear cavity 224 is located outside of the shell 106 (for example, outside of the seat compartment 202). At least a portion of the shell 106 is located above the rear cavity 224. The rear cavity 224 receives the forward section 170 of the frame 110, such as the jogged portion 160. In an exemplary embodiment, part of the compartment 114 is defined in the rear cavity 224. In an exemplary embodiment, portions of the airflow supply and return system 128, such as the air supply duct 142 and/or the air return duct 144 may be located in the rear cavity 224. By locating the jogged portion 160 in the rear cavity 224 of the shell 106, the galley monument 115 may be shifted forward to reduce the effective footprint of the galley monument 115.

The first end wall 220 includes an upper section 230 above the jogged portion 222 and a lower section 232 below the jogged portion 222. A transition section 234 extends between the upper section 230 and the lower section 232. The upper section 230 may abut against the upper section 162. The transition section 234 may abut against the transition section 166. The lower section 232 may abut against the lower section 164. Optionally, the upper section 230 may extend generally vertically and the lower section 232 extends generally vertically with the transition section 234 angled therebetween. Other orientations are possible in alternative embodiments. The jogged portion 222 may be angled non-horizontal between the upper section 230 and the lower section 232 to provide a smooth transition between the upper section 230 and the lower section 232. Optionally, the jogged portion 222 may be curved. In an exemplary embodiment, the jogged portion 222 has a complementary size and shape as the jogged portion 160 such that the jogged portion 160 substantially fills the rear cavity 224. The upper section 230 may be oriented non-vertically in alternative embodiments. The lower section 232 may be oriented non-vertically in alternative embodiments. The transition section 234 may have multiple segments in other embodiments. The transition section 234 may transition smoothly into the upper section 230 and/or the lower section 232 in other embodiments. In the illustrated embodiment, the upper section 230 defines the majority of the first end wall 220, with the transition section 234 being relatively short and the lower section 232 below the transition section 234. However, the upper section 230, the lower section 232 and the transition section 234 may have different heights in alternative embodiments. In various embodiments, the lower section 232 may be positioned below the height of the passenger seat 108.

In an exemplary embodiment, the first end wall 220 includes a forward section 240 and a rear section 242. The forward section 240 is shifted forward compared to the rear section 242 and the rear section 242 is shifted rearward compared to the forward section 240. In the illustrated embodiment, the forward section 240 is defined by the lower section 232 and the rear section 242 is defined by the upper section 230. The forward section 240 may extend along the forward plane 174. In an exemplary embodiment, at least a portion of the seat assembly 102 is located rearward of the forward plane 174. For example, the rear section 242 extends to the upper section 162 of the first end wall 140, and is thus rearward of the forward plane 174. The rear section 242 may extend along the rearward plane 176.

In the illustrated embodiment, the passenger seat 108 includes a seat 250 and a back rest 252. Optionally, the forward section 240 may be located below the seat 250, such as at or near the base 210. The back rest 252 is shown reclined. The space gained by shifting the rear section 242 rearward relative to the forward section 240 to provide additional space for reclining the back rest 252. If the additional space were not provided, the passenger seat 108 would be less comfortable for the passenger or the passenger seat 108 would need to be shifted forward to gain the reclining a space, which would require a deeper shell 106 to accommodate the reclining of the back rest 252. By providing the jogged portions 160, 222, space is provided above the jogged portions 160, 222 for reclining the back rest 252 and space is provided below the jogged portions 160, 222 for routing the air supply duct 142. The back rest 252 is located vertically above the air supply duct 142. In various embodiments, the rear cavity 224 may be made deeper (for example, increasing the length of the transition sections 166, 234) to accommodate larger air ducts and/or additional components, such as electrical components, plumbing components and the like. In other various embodiments, the rear cavity 224 may provide space for other uses, such as stowage under the passenger seat 108. For example, the stowage under the rear cavity 224 may be accessed through the side wall 208 at the aisle.

Figure 3:
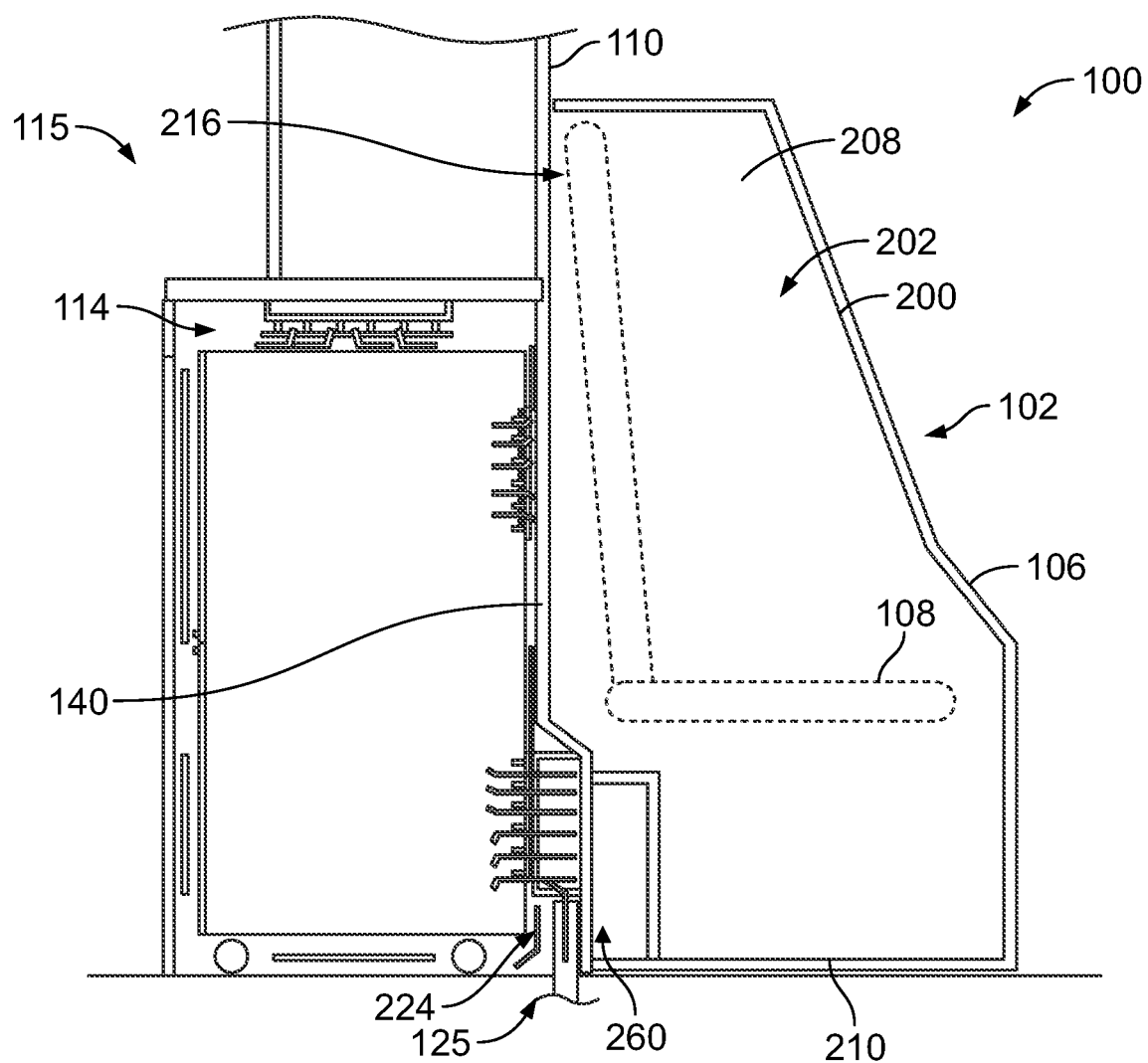
FIG. 3 is a cross-sectional view of a portion of the monument assembly in accordance with an alternative exemplary embodiment.

FIG. 3 is a cross-sectional view of a portion of the galley monument 115 and aircraft monument 100 in accordance with an alternative exemplary embodiment. FIG. 3 illustrates the seat assembly 102 in accordance with an exemplary embodiment connected to the galley monument 115. In the illustrated embodiment, the shell 106 of the seat assembly 102 includes an open rear 216 at the first end wall 140 of the frame 110. The shell 106 does not include the first end wall 220 (shown in FIG. 2). Rather, the first end wall 140 is the only wall between the compartment 114 and the seat compartment 202 of the shell 106. The rear 216 is connected to the first end wall 140. For example, the rear 216 may be secured using fasteners, clips, welding and the like. In alternative embodiments, the shell 106 may be integral with the frame 110. The overall width of the aircraft monument 100 may be reduced by eliminating the first end wall 220 of the shell 106.

In an exemplary embodiment, the shell 106 includes a stowage cavity 260 at the base 210 adjacent the rear cavity 224. The stowage cavity 260 is defined by walls 200 of the shell 106. The stowage cavity 260 may be accessible through the side wall 208, and used for stowage under the passenger seat 108. The stowage cavity 260 may be used for other purposes, such as routing or locating of other system components, such as other components of the galley refrigeration system 125 or components from other systems, such as electrical, plumbing and the like.

Figure 4:
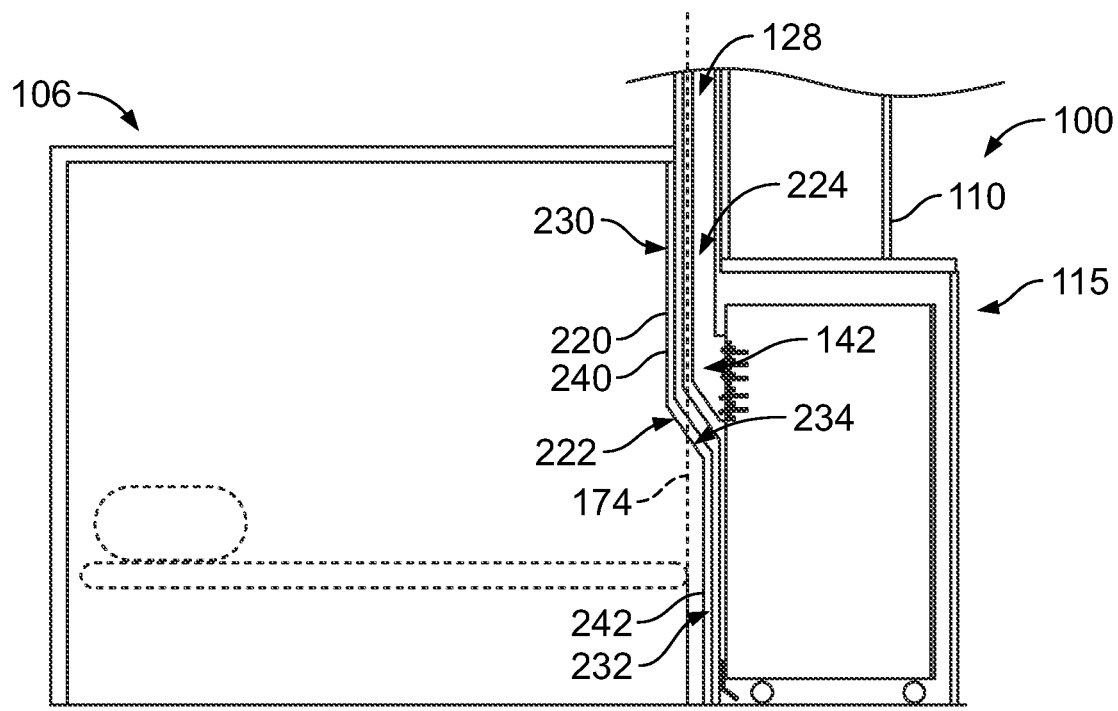
FIG. 4 is a cross-sectional view of a portion of the monument assembly in accordance with an alternative exemplary embodiment.

FIG. 4 is a cross-sectional view of a portion of the galley monument 115 and aircraft monument 100 in accordance with an alternative exemplary embodiment. FIG. 4 illustrates various components of the airflow supply and return system 128 in different locations than the embodiment illustrated in FIG. 2. In the illustrated embodiment, the upper section 230 defines the forward section 240 and the lower section 232 defines the rear section 242. The rear cavity 224 is located above the transition section 234. The air supply duct 142 and the air return duct 144 are located in the rear cavity 224. A portion of the shell 106 is located below the components of the airflow supply and return system 128. For example, the jogged portion 222 of the first end wall 220 is located below the rear cavity 224. The lower section 232 of the first end wall 220 is located rearward of the forward plane 174. Space is gained by locating a portion of the shell 106 rearward of the forward plane 174 of the frame 110. As such, the overall width of the aircraft monument 100 may be reduced. The gained space may be used for added leg room or positioning of the foot well of the shell 106 in the gained space.

Figure 5:
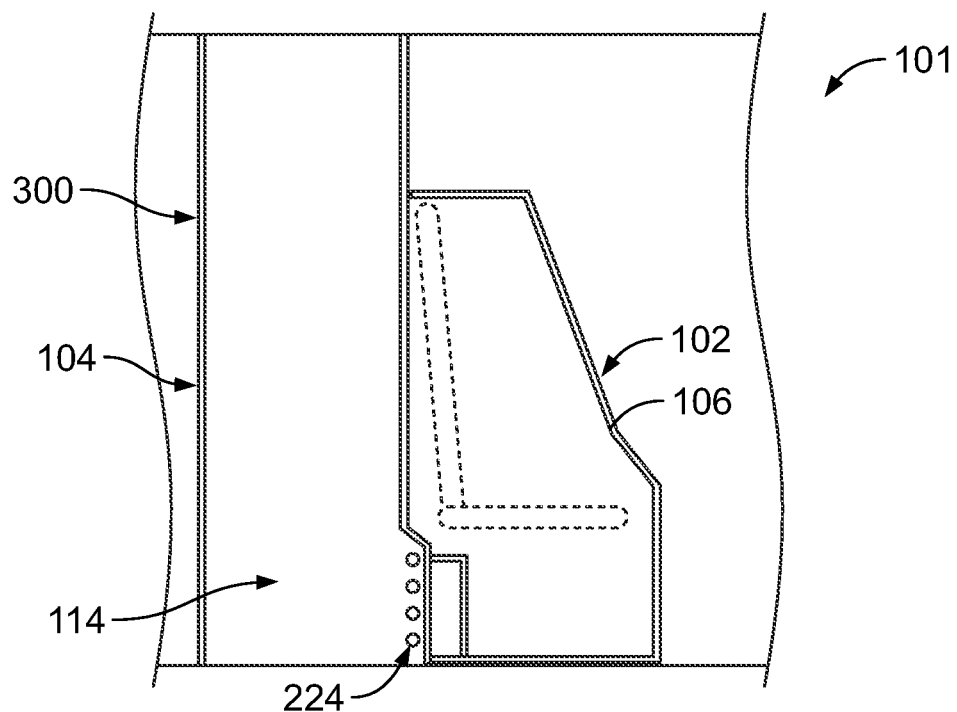
FIG. 5 is a cross-sectional view of a portion of the monument assembly in accordance with an another alternative exemplary embodiment.

FIG. 5 is a cross-sectional view of a portion of the monument assembly 104 and the seat assembly 102 in accordance with an alternative exemplary embodiment. The monument assembly 104, in the illustrated embodiment, is a closet monument 300 with the compartment 114 defining a closet space for stowage of items in the aircraft 101. A portion of the compartment 114 extends into the rear cavity 224 below the shell 106.

Figure 6:
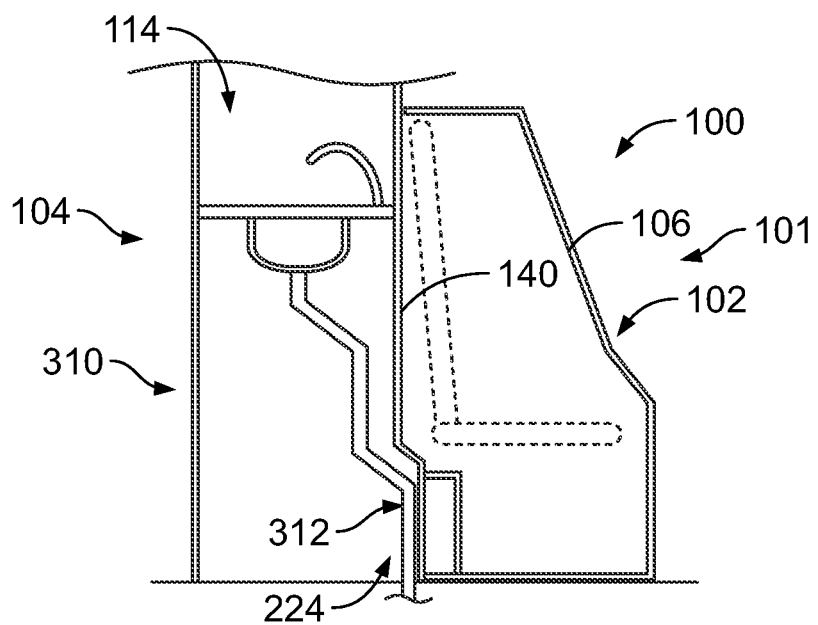
FIG. 6 is a cross-sectional view of a portion of the monument assembly in accordance with yet another exemplary embodiment.

FIG. 6 is a cross-sectional view of a portion of the monument assembly 104 and the seat assembly 102 in accordance with an alternative exemplary embodiment. The monument assembly 104, in the illustrated embodiment, is a lavatory monument 310 with the compartment 114 defining a lavatory space for of the aircraft 101. For example, in the illustrated embodiment, the sink is provided along the first end wall 140. Plumbing lines 312 are routed in the added space defined by the rear cavity 224. A portion of the shell 106 is located above the plumbing lines 312. Space is gained in the lavatory monument 310 by routing the plumbing lines 312 in the rear cavity 224 below the shell 106 allowing the lavatory monument 310 to be narrower to reduce the overall width of the aircraft monument 100.

Figure 7:
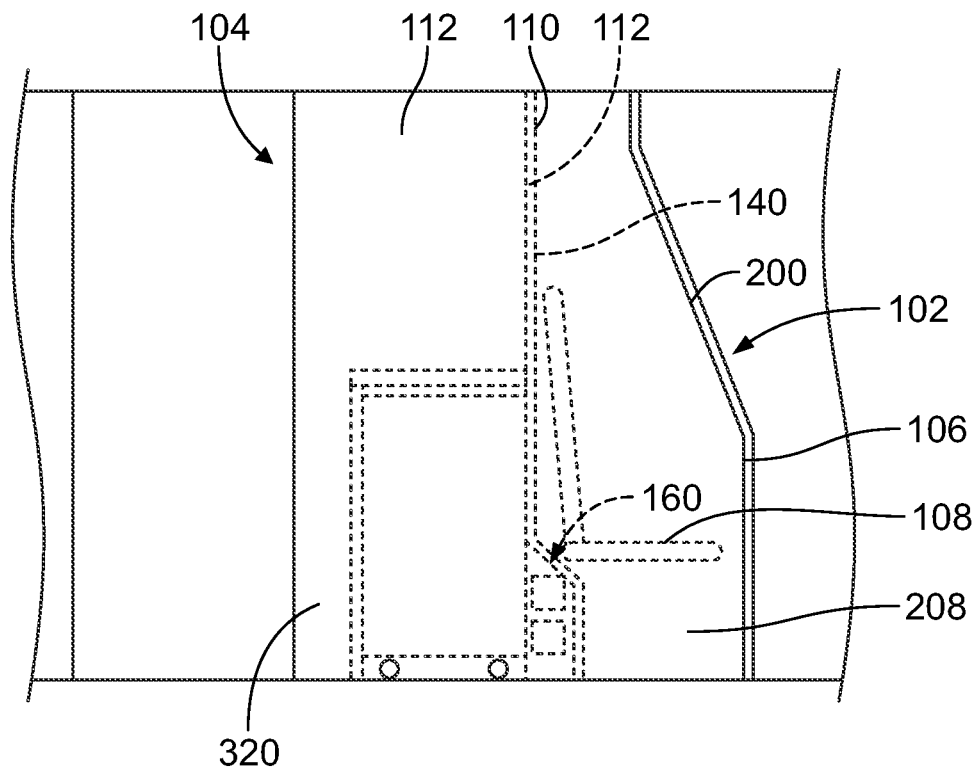
FIG. 7 is a side view of a portion of the monument assembly and the seat assembly in accordance with still another exemplary embodiment.

FIG. 7 is a side view of a portion of the monument assembly 104 and the seat assembly 102 in accordance with an alternative exemplary embodiment. The frame 110 of the monument assembly 104 includes the walls 112 including a side wall 320 and the shell 106 of the seat assembly 102 includes the walls 200 including the side wall 208. In an exemplary embodiment, the side wall 320 and the side wall 208 are integral. For example the side wall 320 and the side wall 208 are a single, continuous wall that is seamless between the frame 110 and the shell 106. The first end wall 140 extends from the side wall 320, such as perpendicular to the side wall 320. In such embodiment, the seat assembly 102 is integral with the monument assembly 104. The shell 106 is manufactured with the frame 110. The first end wall 140 is shaped to include the jogged portion 160, which is bumped forward under at least a portion of the passenger seat 108.

As used herein, an element or step recited in the singular and proceeded with the word "a" or "an" should be understood as not excluding plural of said elements or steps, unless such exclusion is explicitly stated. Furthermore, references to an "embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein". Moreover, in the following claims, the terms "first", "second", and "third", etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An aircraft monument for use in a cabin of an aircraft, the aircraft monument comprising:
   a monument assembly, comprising a frame that comprises a plurality of walls, defining a compartment; and
   a seat assembly forward of the frame
   wherein
   the seat assembly comprises a shell and a passenger seat,
   the passenger seat comprises a seat,
   the plurality of walls of the frame comprises a first end wall, comprising a forward section of the frame at a forward plane of the frame,
   the compartment is defined rearward of the forward section of the frame,
   the shell at least partially surrounds the passenger seat,
   the shell comprises a rear, a bottom, and a side wall that extends forward from the rear of the shell,
   the side wall extends from a height above the seat of the passenger seat to the bottom of the shell, and
   the rear of the shell is located rearward of the forward plane of the frame and above a portion of the compartment of the monument assembly.

2. The aircraft monument of claim 1, wherein:
the shell defines a rear cavity rearward of an outer surface of the shell, and
the forward section of the frame extending into the rear cavity.

3. The aircraft monument of claim 2, wherein the compartment extends into the rear cavity.

4. The aircraft monument of claim 1, wherein the shell comprises a first end wall, defining the rear of the shell, the first end wall of the shell mirroring the first end wall of the plurality of walls of the frame.

5. The aircraft monument of claim 1, wherein the rear of the shell is open and coupled to the first end wall of the plurality of walls of the frame to close the shell from behind the shell.

6. The aircraft monument of claim 1, wherein at least a portion of the passenger seat is configured to extend rearward of the forward plane.

7. The aircraft monument of claim 1, wherein the frame defines a galley monument, the compartment is a galley cart compartment, configured to receive at least one galley cart, and the galley monument comprises a galley refrigeration system, comprising at least one of an air supply duct or an air return duct, positioned below the seat assembly for transporting airflow within the galley monument.

8. The aircraft monument of claim 7, wherein the shell comprises a rear cavity at the rear of the shell, and the at least one of the air supply duct or the air return duct are located in the rear cavity.

9. The aircraft monument of claim 1, wherein the shell comprises a first end wall, defining the rear of the shell, the first end wall of the shell is nonplanar, the first end wall of the plurality of walls of the frame is nonplanar, and the first end wall of the shell has a complementary shape to, and is nested with, the first end wall of the plurality of walls of the frame.

10. The aircraft monument of claim 9, wherein the first end wall of the shell is coupled to the first end wall of the plurality of walls of the frame.

11. The aircraft monument of claim 1, wherein:
the frame comprises a side wall, perpendicular to the first end wall of the plurality of walls of the frame,
the side wall of the shell is integral with the side wall of the frame, and
the side wall of the frame and the side wall of the shell are seamless between the frame and the shell.

12. The aircraft monument of claim 1, wherein:
the shell comprises a base,
the frame comprises a base, and
the forward section of the frame is provided at the base of the frame.

13. The aircraft monument of claim 1, wherein the first end wall of the plurality of walls of the frame comprises a rear section rearward of the forward section, and the shell abuts against the rear section of the first end wall of the plurality of walls of the frame.

14. The aircraft monument of claim 1, wherein the first end wall of the plurality of walls of the frame comprises a jogged portion, and a rear of the shell comprises a jogged portion, nesting with the jogged portion of the first end wall of the plurality of walls of the frame.

15. The aircraft monument of claim 1, wherein:
the first end wall of the plurality of walls of the frame comprises an upper section, a lower section, and a transition section between the upper section and the lower section,
the transition section defines a jogged portion,
the lower section defines the forward section of the frame,
the transition section and the upper section are rearward of the lower section, and
the shell extends along the transition section and the upper section over the lower section.

16. An aircraft monument for use in a cabin of an aircraft, the aircraft monument comprising:
a monument assembly, comprising a frame that comprises a plurality of walls, defining a compartment; and
a seat assembly that comprises a shell and a passenger seat,
wherein
the plurality of walls comprises a first end wall that comprises a jogged portion,
the first end wall of the plurality of walls of the frame comprises an upper section, a lower section, and a transition section between the upper section of the first end wall of the plurality of walls of the frame and the lower section of the first end wall of the plurality of walls of the frame,
the transition section of the first end wall of the plurality of walls of the frame defines the jogged portion of the first end wall of the plurality of walls of the frame,
an upper intersection between the transition section of the first end wall of the plurality of walls of the frame and the upper section of the first end wall of the plurality of walls of the frame is at a rearward plane,
a lower intersection between the transition section of the first end wall of the plurality of walls of the frame and the lower section of the first end wall of the plurality of walls of the frame is at a forward plane that is laterally offset forward of the rearward plane,
the compartment is defined rearward of at least one of the upper section of the first end wall of the plurality of walls of the frame and the lower section of the first end wall of the plurality of walls of the frame,
the shell at least partially surrounds the passenger seat,
the passenger seat comprises a seat,
the shell comprises a rear, a bottom, and a side wall that extends forward from the rear of the shell,
the side wall extends from a height above the seat of the passenger seat to the bottom of the shell,
the rear of the shell comprises a jogged portion, an upper section, a lower section, and a transition section,
the upper section of the rear of the shell extends along the upper section of the first end wall of the plurality of walls of the frame,
the lower section of the rear of the shell extends along the lower section of the first end wall of the plurality of walls of the frame,
the transition section of the rear of the shell extends along the transition section of the first end wall of the plurality of walls of the frame,
the transition section of the rear of the shell extends between the upper section of the rear of the shell and the lower section of the rear of the shell and defines the jogged portion of the rear of the shell,
the upper section of the rear of the shell is rearward of the forward plane, and
the lower section of the rear of the shell is positioned forward of the forward plane.

17. The aircraft monument of claim 16, wherein:
the shell defines a rear cavity rearward of an outer surface of the shell, and
the lower section of the first end wall of the plurality of walls of the frame extends into the rear cavity.

18. The aircraft monument of claim 17, wherein:
the first end wall of the plurality of walls of the frame comprises a rear section rearward of a forward section, and
the shell abuts against the rear section of the first end wall of the plurality of walls of the frame.

19. The aircraft monument of claim 16, wherein:
the shell comprises a first end wall defining the rear of the shell,
the first end wall of the shell is nonplanar,
the first end wall of the plurality of walls of the frame is nonplanar, and
the first end wall of the shell has a complementary shape to, and is nested with, the first end wall of the plurality of walls of the frame.

20. The aircraft monument of claim 16, wherein:
the first end wall of the plurality of walls of the frame comprises a rear section rearward of a forward section, and
the shell abuts against the rear section of the first end wall of the plurality of walls of the frame.

\* \* \* \* \*